(12) United States Patent
Childres et al.

(10) Patent No.: US 6,990,839 B1
(45) Date of Patent: Jan. 31, 2006

(54) ADJUSTABLE LANDING GEAR LOCKING DEVICE

(76) Inventors: Chris Childres, 7261 Eagles Perch Ct., Jacksonville, FL (US) 32244; Chris Pain, 2285 Marsh Hawk La., Apt. 9-205, Orange Park, FL (US) 32203

( * ) Notice: Subject to any disclaimer, the term of this patent is extended or adjusted under 35 U.S.C. 154(b) by 0 days.

(21) Appl. No.: 10/756,870

(22) Filed: Jan. 15, 2004

(51) Int. Cl.
E05B 73/00 (2006.01)
(52) U.S. Cl. .................. 70/62; 70/14; 70/199; 70/466
(58) Field of Classification Search .................. 70/14, 70/18–19, 53, 62, 158–169, 198–200, 202–206, 70/238, 466, 180–184, 211–212, 234–235; 248/354.5, 354.4, 503.1, 501; 280/763.1
See application file for complete search history.

(56) References Cited

U.S. PATENT DOCUMENTS

| | | | | |
|---|---|---|---|---|
| 589,861 | A | * | 9/1897 | Cuzzo et al. ................. 70/18 |
| 1,359,213 | A | * | 11/1920 | Welch ........................... 70/18 |
| 3,748,876 | A | * | 7/1973 | Mathews ...................... 70/18 |
| 3,959,995 | A | * | 6/1976 | Fletcher ....................... 70/18 |
| 4,296,615 | A | * | 10/1981 | Zoor ............................. 70/19 |
| 4,730,468 | A | | 3/1988 | Becker |
| 4,760,718 | A | * | 8/1988 | Muramatsu et al. .......... 70/18 |
| 5,475,993 | A | * | 12/1995 | Kuo ............................. 70/18 |
| 5,544,505 | A | * | 8/1996 | McIntosh et al. ............. 70/18 |
| 5,782,115 | A | | 7/1998 | Judy |
| 5,913,906 | A | * | 6/1999 | Strocchi ....................... 70/18 |
| 6,076,380 | A | | 6/2000 | Hulak |
| 6,141,997 | A | | 11/2000 | Blehi, III |
| 6,164,097 | A | * | 12/2000 | McBryde ...................... 70/18 |
| 6,393,880 | B1 | * | 5/2002 | Vance, Sr. ................... 70/174 |
| 6,427,497 | B1 | * | 8/2002 | Mossberg et al. ............. 70/18 |
| 6,427,499 | B1 | * | 8/2002 | Derman ........................ 70/19 |
| 6,434,982 | B1 | | 8/2002 | Rowland |
| 6,463,953 | B1 | * | 10/2002 | Cuzzo et al. ................. 137/296 |

* cited by examiner

Primary Examiner—Brian E. Glessner
Assistant Examiner—Christopher Boswell

(57) ABSTRACT

A landing gear locking device includes a plurality of locking members pivotally connected to each other for allowing the locking members to be moved between open and closed positions. The device further includes a plurality of hasps secured to the locking members, which are engageable with each other when the lock is moved to a closed position. At least one locking pin is secured to one of the locking members and extends outwardly therefrom for being positioned into a landing gear shaft so that same can be prevented from moving beyond a predetermined position.

9 Claims, 6 Drawing Sheets

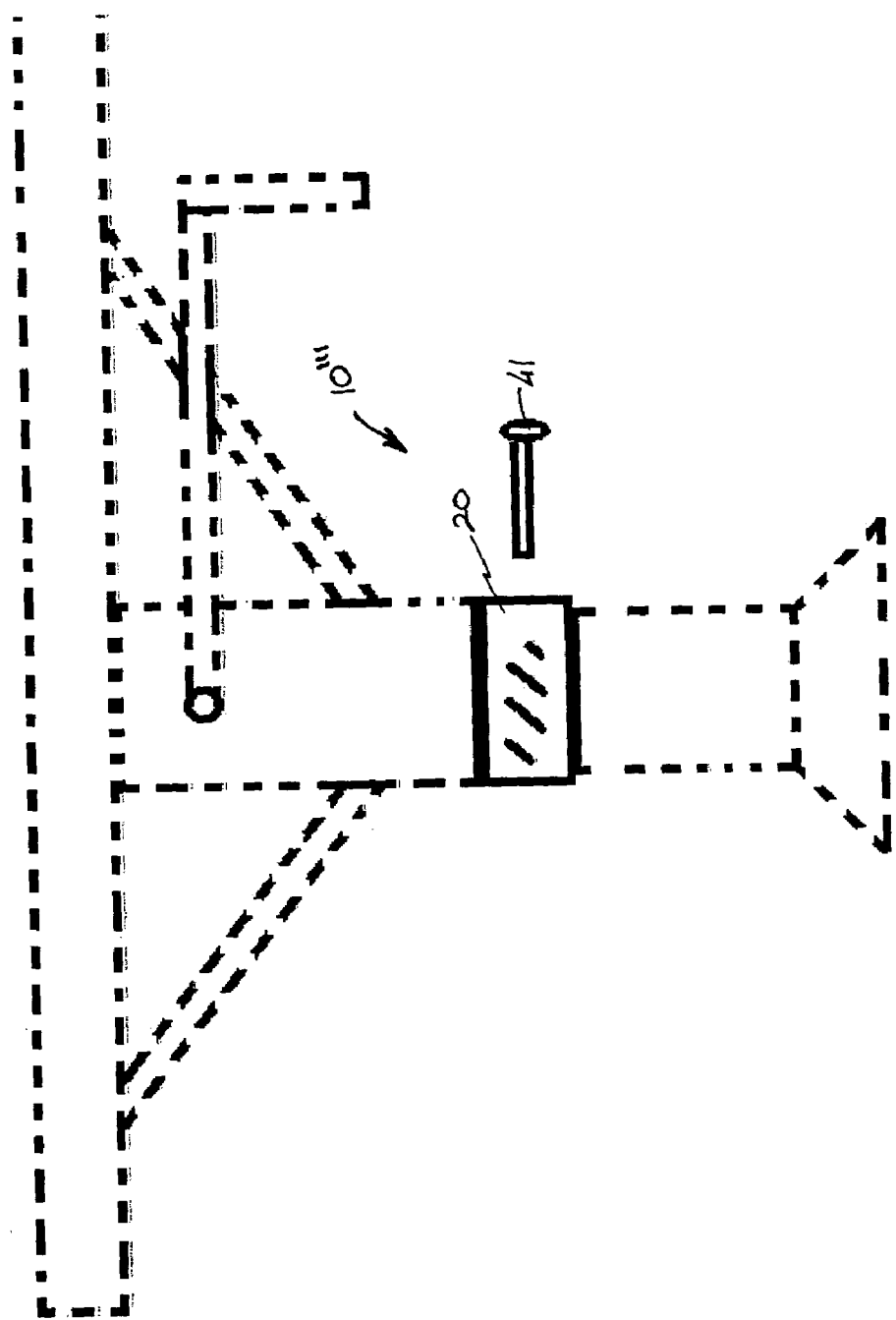

ADJUSTABLE LANDING GEAR LOCKING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a locking device and, more particularly, to an adjustable landing gear locking device.

2. Prior Art

Semi-trailers typically include a road tractor and a trailer equipped with a standardized coupling system, which enables any type of trailer to be attached to any tractor. Loads of all types are transported by such vehicles, and it is not rare for these loads to represent a substantial amount of money, which naturally attracts thieves.

During transport, the trailers with their load are often detached, for example, while being grouped or de-grouped, and left waiting, to enable the tractor to be attached to other trailers so as to use the equipment profitably, with the equipment being specifically designed to enable such type of operations. To this end, the front of the trailer, which is deprived of wheels and rests during transport on a platform of the tractor, is equipped with two telescopic props maneuvered by means of a simple removable crank.

Landing gear assemblies for semi-trailers and the like use a cranking system with a handle which can be locked either in a storage position or in an extended standard position whereby the handle can be used to crank the landing gear up or down. Currently used props are almost all of the same model, each of them being constituted by two cross-sectional tubes sliding in one another, the lower tube bearing an base portion resting on the ground and being actuated by a removable crank. In order to steal the trailer and its load, one need only have a standard type of tractor and a crank to actuate the props, since the latter must be raised to enable their displacement.

For some time, thefts of trailers have increased, and up until now, no satisfactory means have been found enabling such actions to be countered, except for the use of security guards, which results in both substantial and repetitive expenditure.

Accordingly, a need remains for a landing gear lock that overcomes the above-noted shortcomings.

BRIEF SUMMARY OF THE INVENTION

In view of the foregoing background, it is therefore an object of the present invention to provide an adjustable landing gear locking device. These and other objects, features, and advantages of the invention are provided by a landing gear locking device including a plurality of locking members. Each of the plurality of locking members have a first end portion pivotally connected to each other for allowing the plurality of locking members to be selectively moved between open and closed positions. Each of the plurality of locking members further has a second end portion removably engageable with each other when positioned about a perimeter of a landing gear shaft.

In an alternate embodiment, one of the plurality of locking members may include a plurality of elongated sections pivotally connected to each other for preferably allowing the device to be engaged about a landing gear shaft that has an oblique shape. In another embodiment, the plurality of locking members may be formed to have substantially non-linear shapes such as substantially arcuate shapes, for example, so that the lock can be engaged about an annular landing gear shaft.

A plurality of hasps may be secured to the plurality of locking members and are engageable with each other when the lock is moved to a closed position. The plurality of hasps each have an aperture formed therein and are alignable with each other for receiving a conventional lock therethrough to advantageously maintain the device at a closed position.

The lock further includes a first locking pin secured to one of the plurality of locking members and extends outwardly therefrom. In particular, the first locking pin has an end portion disposed adjacent to one of the plurality of locking members. Such a locking pin is positionable into a landing gear shaft for preventing a landing gear from moving beyond a predetermined position. In an alternate embodiment, there may be a second locking pin secured to another one of the plurality of locking members. Such a locking pin extends outwardly from the locking member towards the first locking pin and is removably positionable into a landing gear shaft. In such an embodiment, the first and second locking pins are diametrically opposed from each other.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 6 is a side elevational view showing yet another embodiment of the device shown in FIG. 1 wherein the locking pin is removably engageable with the plurality of locking members.

DETAILED DESCRIPTION OF THE INVENTION

Figure 1:
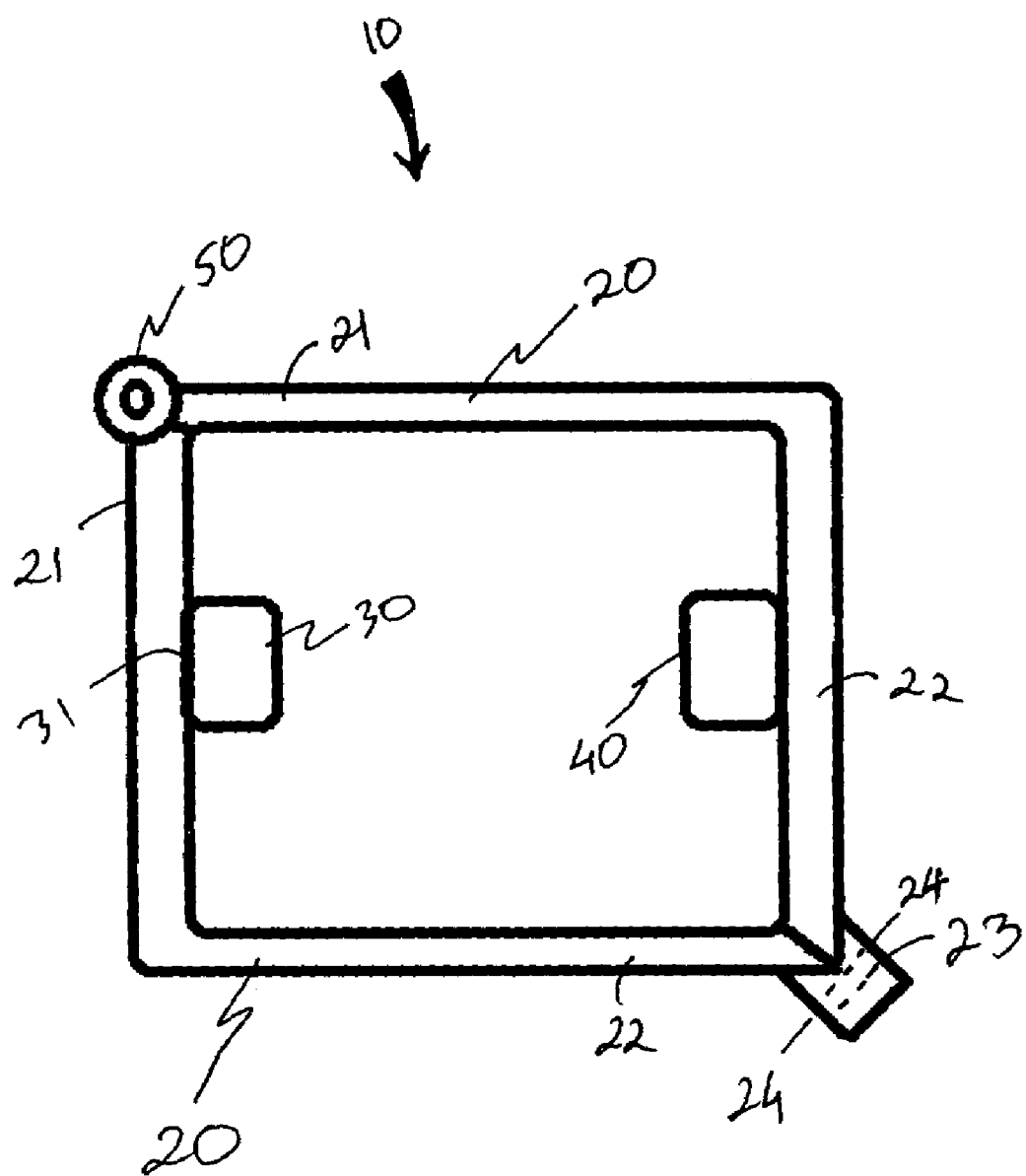
FIG. 1 is a top plan view showing an adjustable landing gear locking device, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements and prime notations refer to alternate elements throughout the figures.

The device of this invention is referred to generally in FIGS. 1–6 by the reference numeral 10 and is intended to provide an adjustable landing gear locking device. It should be understood that the apparatus 10 may be used to protect various conventional landing gears well known in the industry.

Referring initially to FIG. 1, a landing gear locking device 10 includes a plurality of locking members 20. Each plurality of locking members 20 have a first end portion 21 pivotally 50 connected to each other for allowing the plurality of locking members 20 to be selectively moved between open and closed positions. Each of the plurality of locking members 20 further has a second end portion 22 removably engageable with each other when positioned about a perimeter of a landing gear shaft, as perhaps best shown in FIG. 6.

Figure 2:
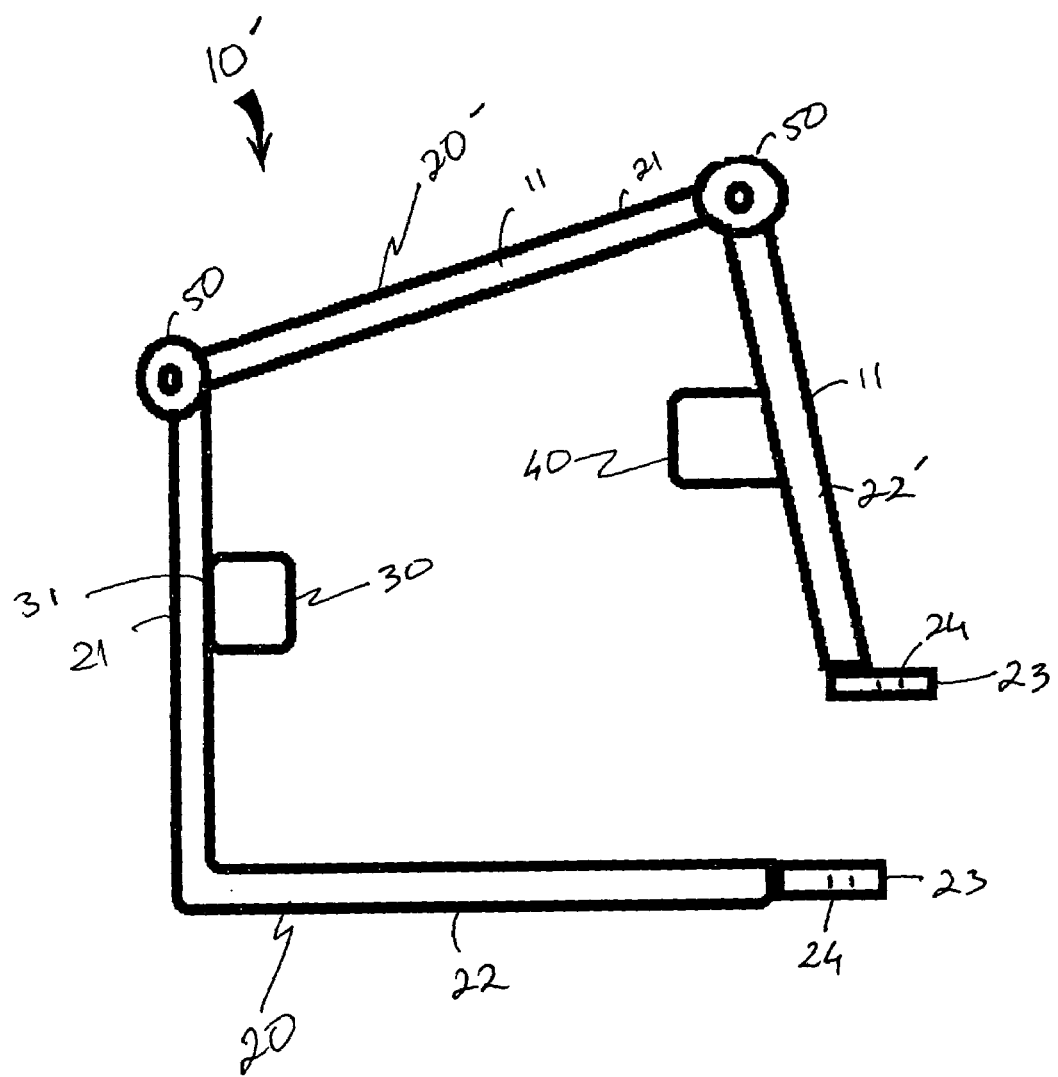
FIG. 2 is a top plan view showing an alternate embodiment of the device shown in FIG. 1.

Now referring to FIG. 2, one of the plurality of locking members 20 includes a plurality of elongated sections 11 pivotally 50 connected to each other for allowing the device 10 to be engaged about a landing gear shaft having an oblique shape. Alternately, as perhaps best shown in FIG. 5, the plurality of locking members 20 may be formed to have non-linear shapes such as substantially arcuate shapes, for example, so that the lock 10 can be positioned about an annular landing gear shaft.

Referring back to FIG. 2, a plurality of hasps 23 are secured to the plurality of locking members 20 and are engageable with each other when the lock 10 is moved to a closed position. The plurality of hasps 23 each have an aperture 24 formed therein and are alignable with each other for receiving a conventional lock (not shown) therethrough to maintain the device 10 at a closed position.

Figure 3:
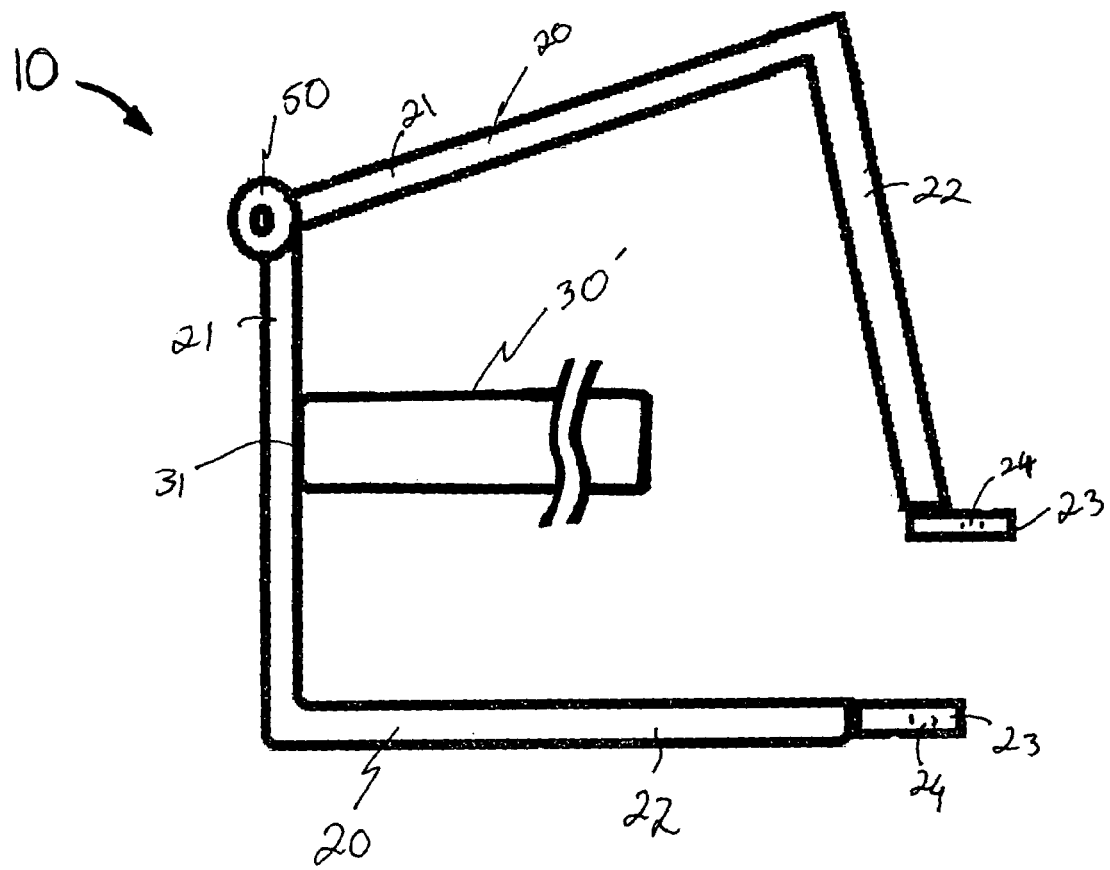
FIG. 3 is a top plan view showing another embodiment of the device shown in FIG. 1.
Figure 4:
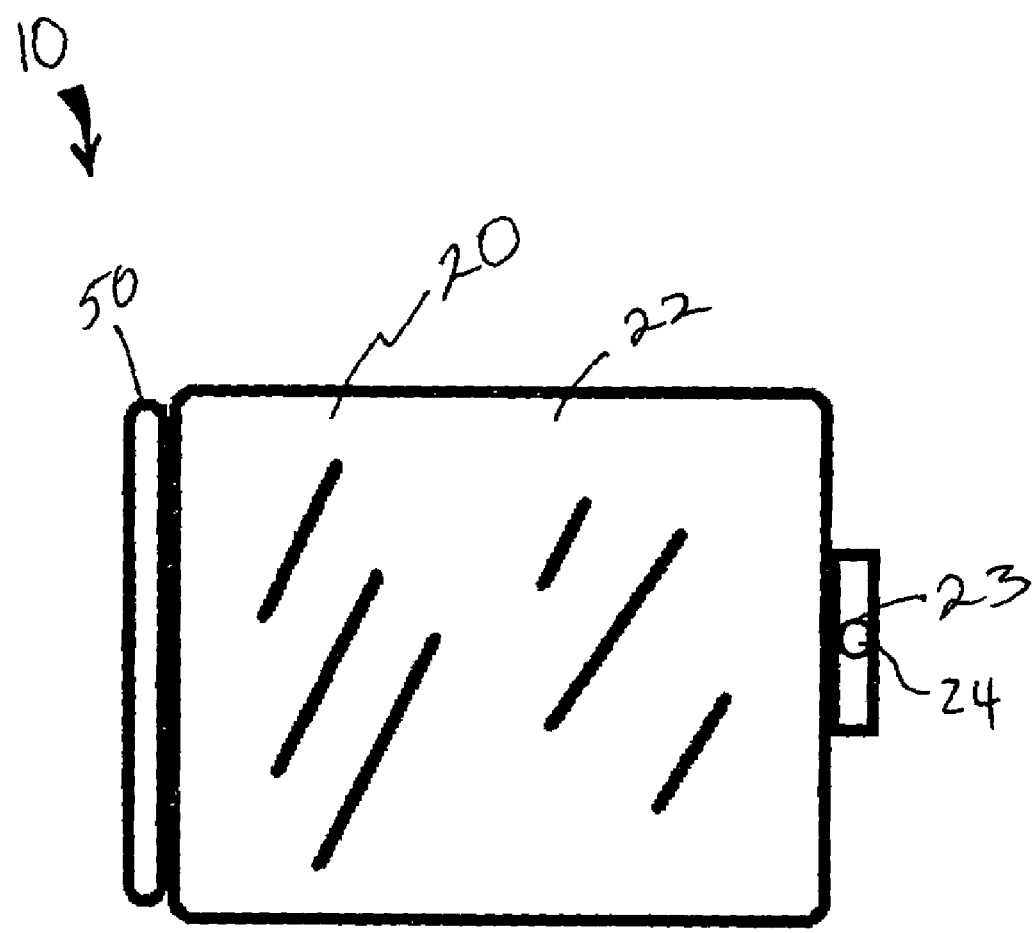
FIG. 4 is a side elevational view of the device shown in FIG. 1.

As perhaps best shown in FIG. 3, the lock 10 may include only a first locking pin 30 secured to one the plurality of locking members 20 and extending outwardly therefrom. Such a locking pin 30 has an elongated shape and is positionable into a landing gear shaft for preventing a landing gear from moving beyond a predetermined position. In particular, the first locking pin 30 has an end portion 31 disposed adjacent to one of the plurality of locking members 20.

Figure 5:
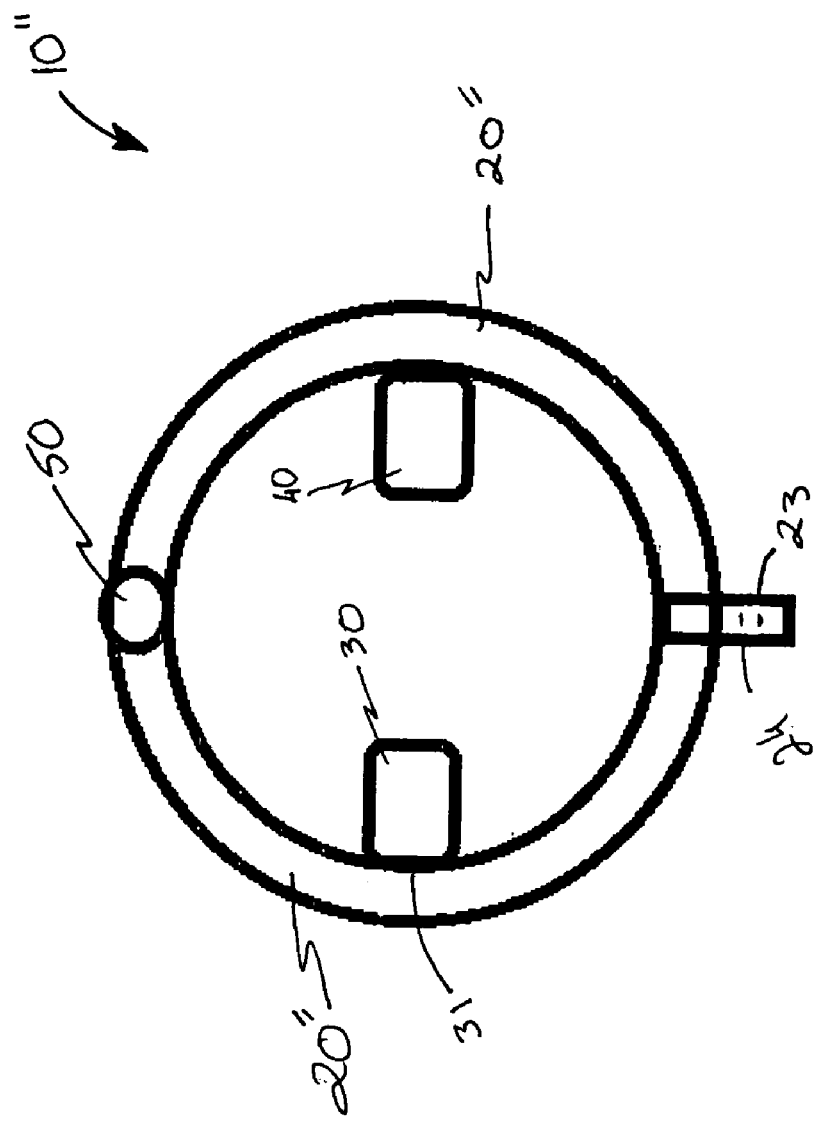
FIG. 5 is a top plan view showing yet another embodiment of the device shown in FIG. 1.

Now referring to FIGS. 1, 2 and 5, the lock 10' and 10", respectively, may include a second locking pin 40 secured to another of the plurality of locking members 20 and extending outwardly therefrom towards the first locking pin 30. Such a locking pin 40 is also removably positionable into a landing gear shaft and is diametrically opposed from the first 30. Finally, FIG. 6 shows yet another embodiment wherein the lock 10 includes an elongated locking pin 41 is removably positionable into the locking members 42, 43 rather than being welded to same. Advantageously, such a locking pin 41 may be periodically replaced, if the opening through the landing gear shaft is irregularly shaped.

The device 10 fulfills the need for a relatively inexpensive lock to prevent the theft of parked trailers in a drop yard or depot. The shape of the locking members 20 gives the user the advantage of being able to use it on different shaped landing gear shafts, therefore eliminating the need for many different locking devices.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A landing gear locking device comprising;
   a plurality of locking members each having a first end portion pivotally connected to each other for allowing said plurality of locking members to be selectively moved between open and closed positions, each said plurality of locking member further having a second end portion removably engageable with each other when positioned about a perimeter of a landing gear shaft;
   wherein one said plurality of locking members comprises a plurality of elongated sections pivotally connected to each other for allowing said device to be engaged about a landing gear shaft having an oblique shape, each said elongated sections having a linear shape wherein one said elongated sections is pivotally connected to another said elongated sections, said another elongated section being pivotally connected to another said locking members, said elongated sections and said another locking member having an interior surface directly engageable with the landing gear shaft and remaining in continuous contact therewith when said locking members are adapted to a closed position, said another locking member having a rigid and non-adaptable L-shape;
   wherein said locking members are selectably adaptable to form a substantially square shape;
   a plurality of hasps secured to said plurality of locking members and being engageable with each other when said lock is moved to a closed position, said plurality of hasps each having an aperture formed therein and being alignable with each other for receiving a lock therethrough to thereby maintain said device at a closed position;
   wherein said locking members rest at an equilibrium position when said hasps are engaged with each other, said locking members remaining at the equilibrium position when said hasps are disengaged from each other; and
   a first locking pin secured to one said plurality of locking members and extending outwardly therefrom, said first locking pin being positionable into a landing gear shaft for preventing a landing gear from moving beyond a predetermined position.

2. The locking device of claim 1, further comprising:
   a second locking pin secured to another said plurality of locking members and extending outwardly therefrom towards said first locking pin and being removably positionable into a landing gear shaft, said first and second locking pins being oppositely spaced from each other.

3. The locking device of claim 1, wherein said first locking pin has an end portion disposed adjacent another said plurality of locking members.

4. The locking device of claim 1, wherein said plurality of locking members are formed to have substantially non-linear shapes.

5. A landing gear locking device comprising:
a plurality of locking members each having a first end portion pivotally connected to each other for allowing said plurality of locking members to be selectively moved between open and closed positions, each said plurality of locking member further having a second end portion removably engageable with each other when positioned about a perimeter of a landing gear shaft;
wherein one said plurality of locking members comprises a plurality of elongated sections pivotally connected to each other for allowing said device to be engaged about a landing gear shaft having an oblique shape, each said elongated sections having a linear shape wherein one said elongated sections is pivotally connected to another said elongated sections, said another elongated section being pivotally connected to another said locking members, said elongated sections and said another locking member having an interior surface directly engageable with the landing gear shaft and remaining in continuous contact therewith when said locking members are adapted to a closed position, said another locking member having a rigid and non-adaptable L-shape;
wherein said locking members are selectable adaptable to form a substantially rectangular or square shape;
a plurality of hasps secured to said plurality of locking members and being engageable with each other when said lock is moved to a closed position, said plurality of hasps each having an aperture formed therein and being alignable with each other for receiving a lock therethrough to thereby maintain said device at a closed position;
wherein said locking members rests at an equilibrium position when said hasps are engaged with each other, said locking members remaining at the equilibrium position when said hasps are disengaged from each other;
a first locking pin secured to one said plurality of locking members and extending outwardly therefrom, said first locking pin being positionable into a landing gear shaft for preventing a landing gear from moving beyond a predetermined position; and
a second locking pin secured to another said plurality of locking members and extending outwardly therefrom towards said first locking pin and being removably positionable into a landing gear shaft, said first and second locking pins being oppositely spaced from each other.

6. The locking device of claim 5, wherein said first locking pin has an end portion disposed adjacent another said plurality of locking members.

7. The locking device of claim 6, wherein said plurality of locking members are formed to have substantially non-linear shapes.

8. A landing gear locking device comprising:
a plurality of non-linear locking members each having a first end portion pivotally connected to each other for allowing said plurality of locking members to be selectively moved between open and closed positions, each said plurality of locking member further having a second end portion removably engageable with each other when positioned about a perimeter of a landing gear shaft;
wherein one said plurality of locking members comprises a plurality of elongated sections pivotally connected to each other for allowing said device to be engaged about a landing gear shaft having an oblique shape, each said elongated sections having a linear shape wherein one said elongated sections is pivotally connected to another said elongated sections, said another elongated section being pivotally connected to another said locking members, said elongated sections and said another locking member having an interior surface directly engageable with the landing gear shaft and remaining in continuous contact therewith when said locking members are adapted to a closed position, said another locking member having a rigid and non-adaptable L-shape;
wherein said locking members are selectably adaptable to form a substantially rectangular or square shape;
a plurality of hasps secured to said plurality of locking members and being engageable with each other when said lock is moved to a closed position, said plurality of hasps each having an aperture formed therein and being alignable with each other for receiving a lock therethrough to thereby maintain said device at a closed position;
wherein said locking members define an equilibrium position when said hasps are engaged with each other, said locking members remaining at an equilibrium position when said hasps are disengaged from each other;
a first locking pin secured to one said plurality of locking members and extending outwardly therefrom, said first locking pin being positionable into a landing gear shaft for preventing a landing gear from moving beyond a predetermined position; and
a second locking pin secured to another said plurality of locking members and extending outwardly therefrom towards said first locking pin and being removably positionable into a landing gear shaft, said first and second locking pins being oppositely spaced from each other.

9. The locking device of claim 8, wherein said first locking pin has an end portion disposed adjacent another said plurality of locking members.

* * * * *